United States Patent
Boutin (10) Patent No.: US 11,353,660 B2
(45) Date of Patent: Jun. 7, 2022

(54) OPTICAL DELAY LINE DEVICE WITH FIXED OR VARIABLE DELAY

(71) Applicant: KYLIA, Paris (FR)

(72) Inventor: Aurélien Boutin, Cestas (FR)

(73) Assignee: KYLIA

( * ) Notice: Subject to any disclaimer, the term of this patent is extended or adjusted under 35 U.S.C. 154(b) by 0 days.

(21) Appl. No.: 16/692,578

(22) Filed: Nov. 22, 2019

(65) Prior Publication Data

US 2020/0166708 A1    May 28, 2020

(30) Foreign Application Priority Data

Nov. 23, 2018  (FR) ...................................... 1871797

(51) Int. Cl.
| | |
|---|---|
| G02B 6/28 | (2006.01) |
| G02B 5/04 | (2006.01) |
| G02B 6/35 | (2006.01) |
| G01B 9/02 | (2022.01) |
| G02B 6/42 | (2006.01) |

(52) U.S. Cl.
CPC ....... G02B 6/2861 (2013.01); G01B 9/02051 (2013.01); G02B 5/04 (2013.01); G02B 6/352 (2013.01); G02B 6/4292 (2013.01)

(58) Field of Classification Search
None
See application file for complete search history.

(56) References Cited

U.S. PATENT DOCUMENTS

| 3,424,516 A | 1/1969 | Synder |
| 2007/0009207 A1 | 1/2007 | Xu et al. |
| 2007/0109552 A1 | 5/2007 | Felix et al. |
| 2020/0319440 A1 * | 10/2020 | Heidemann ............ A61B 3/102 |

FOREIGN PATENT DOCUMENTS

| CN | 203324573 | 12/2013 |
| JP | 2016206529 A | * 12/2016 |

OTHER PUBLICATIONS

French Preliminary Search Report, French Application No. 1871797, dated Oct. 15, 2019.

* cited by examiner

*Primary Examiner* — Omar R Rojas
(74) *Attorney, Agent, or Firm* — Perman & Green, LLP (57) ABSTRACT

An optical delay line device, providing a fixed or variable optical delay, including an optical input, an optical output, an optical assembly that directs a beam along an optical path from the input to the output. The optical assembly including; a retroreflector, an optical element including first, second and third reflective surfaces, the second and third reflective surfaces being arranged to make therebetween an angle of 45°, a beam that propagates along the optical path and enters said optical element being reflected by the first surface with an angle of 90° toward the second surface, then being reflected by the second and third surfaces to exit from the optical element in a direction parallel to the direction of the beam incident on the optical element, and said optical element is arranged so as to steer said output beam onto said second surface of said retroreflector.

17 Claims, 5 Drawing Sheets

OPTICAL DELAY LINE DEVICE WITH FIXED OR VARIABLE DELAY

CROSS REFERENCE TO RELATED APPLICATION

This application claims priority to, and the benefit of, French Application No. 1871797, filed on 23 Nov. 2018, the disclosure of which is incorporated herein by reference in its entirety.

BACKGROUND

1. Field

The disclosed embodiment relates to the general field of optical systems, in particular in devices delivering an adjustment of the delay in an optical delay line.

It is applicable to any optical system operating in free space and comprising a movable optical element, and in which a beam must be steered very precisely.

It also relates to a new optical element the original design of which ensures a positional invariance of a return beam with respect to the beam incident on this optical element.

2. Brief Description of Related Developments

Optical systems allowing a beam having a given direction of incidence to be steered in the same direction are known.

Among these optical systems, the corner-cube reflector has been about for a long time. A beam incident on a reflective orthogonal trihedron produces a parallel output beam, whatever the angle of incidence with respect to the diagonal of the cube.

An optical setup referred to as a "cat's-eye", which is composed of a convergent optical system, in the focal plane of which a mirror is placed perpendicular to the optical axis of this optical system, is also known.

These optical systems ensure a self-alignment of the direction of the output beam with the incident beam.

However, these prior-art optical systems do not allow an entering incident beam to be steered to the same position.

Specifically, a lateral offset of the incident beam, causes, in such optical systems, a lateral offset of the return beam.

However, for certain scientific or industrial applications, the obtainment of an angular invariance alone is insufficient. A positional invariance of the steered beam is also necessary.

In particular, in the case of production of an optical delay line, it may be beneficial to achieve both these two types of invariance.

One known approach to producing such an optical delay line is to place two planar mirrors at 90°, each on a movable holder.

An incident beam coming from an input optical fiber is addressed, via a collimating lens, to a first of these mirrors, then is reflected in succession by these two mirrors before being steered by an imaging lens into an output optical fiber. The movable holder may then be moved translationally with respect to a fixed holder bearing the input and output optical fibers and the lenses, in order to vary the optical delay.

In such a prior-art optical-delay-line device, it is necessary to very precisely align the mirrors with respect to each other, with respect to the collimating lenses and with respect to the input and output optical fibers.

These aligning operations may prove to be time-consuming and tedious for the operator.

To overcome this drawback, it is known to use a corner-cube reflector, which is mounted on the movable holder instead of the mirrors. Use thereof is easier.

However, the movable holder must be moved very precisely in order to maintain the quality of the alignment. Specifically, the translational axis must be as linear as possible and the optical axis of the beam must be aligned with this translational axis. This results in high installation costs, in order to guarantee that the mechanical system for moving the movable holder has a minimum of imperfections.

Even if such a delay line is regarded as being satisfactory, it leads to insertion losses that may prove to be non-prejudicial in certain technical fields.

In addition, over time, the appearance of mechanical play related to wear of the parts of the mechanical system for moving the movable holder and/or an inclination of one of the mirrors, are liable to aggravate these insertion losses.

Thus, there is a pressing need for an optical delay line providing a variable delay the original design of which ensures an identical position and orientation of the return beam in order to permit coupling to an output optical fiber with a minimum of insertion loss, even when the system ensuring the mechanical translation has imperfections.

SUMMARY

The presently disclosed embodiment relates to an optical-delay-line device providing a fixed or variable delay, which is simple in its design and in its operating mode, compact and economical, and which meets the aforementioned drawbacks.

One subject of the presently disclosed embodiment is thus an optical-delay-line device that ensures an incident beam is steered to the same location and with the same direction, whatever the position and direction of the incident beam.

Thus, coupling losses to an optical output, such as an optical fiber, may be as low as possible while being stable over all the range of tunability.

The presently disclosed embodiment also relates to a particularly simple optical element that is easy to manipulate and economical, for implementation in this optical-delay-line device providing a fixed or variable optical delay.

It also relates to an optical interferometer or an imaging system for acquiring the image of a sample, equipped with such an optical-delay-line device providing a fixed or variable optical delay.

To this end, the disclosed embodiment relates to an optical-delay-line device providing a fixed or variable optical delay, said device comprising:

an optical input, an optical output, which receives a return beam, an optical assembly that directs a beam along an optical path from said optical input to said optical output, said optical assembly comprising:

a retroreflector that ensures a self-alignment of the direction of the output beam of the retroreflector with the direction of the beam incident on the retroreflector, the direction of the output beam, which is called the second direction, being opposite to that of the beam incident on the retroreflector, and an optical element that is said to ensure positional invariance, comprising a first reflective surface, a second reflective surface and a third reflective surface, said first, second and third reflected surfaces being planar or substantially planar, said second and third reflective surfaces being arranged to make therebetween an angle of 45°, the beam that propagates along said optical path and that enters said optical element in said second direction, being reflected by said first surface with an angle of 90° toward said second surface, then being reflected in succession by said second and third surfaces in order to exit from said optical element in a direction parallel to the direction of the beam incident on said optical element, said beam output from said optical element having a constant positional offset Δ with respect to the beam incident on said optical element, said optical element being arranged in said optical assembly so as to steer said output beam from the optical element that is said to ensure positional invariance onto said retroreflector, the return beam thus passing through said retroreflector.

Very advantageously, said optical element that is said to ensure positional invariance may be arranged so that said beam entering said optical element in said second direction is in succession reflected by the third reflective surface, the second reflective surface and the first reflective surface in order to exit in a direction parallel to the direction of the beam incident on said optical element, said beam output from said optical element also having a constant positional offset Δ with respect to the beam incident on said optical element. In other words, the incident beam may also follow an inverse optical path in the optical element that is said to ensure positional invariance.

The first passage through the retroreflector allows an incident beam to be reflected with an angular invariance so that this beam will always have the desired orientation with respect to the optical element. The beam reflected by the optical element is parallel to the incident beam entering this optical element but positionally offset by a constant spacing. The retroreflector and the optical element are arranged so that the return beam makes a second passage through the retroreflector, while being positionally offset with respect to the first passage, by an invariant value. The second passage allows the return beam to be steered to be level with the incident beam. The return beam is therefore systematically parallel to the incident beam while being constantly offset with respect to the latter, in order to offer an optimal optical coupling to an optical output such as an optical fiber.

A double passage through the same retroreflector is therefore delivered in this optical-delay-line device by virtue of a particularly novel optical element that guarantees a positional invariance of the return beam with respect to an incident beam.

In various particular aspects of the disclosed embodiment of this optical-delay-line device providing a fixed or variable optical delay, each having its own advantages and capable of many technically possible combinations:

said retroreflector is movable with respect to said optical input and optical output and with respect to said optical element in order to vary the length of said optical path.

Such an optical device advantageously permits the production of very large optical delays.

Said retroreflector is translationally movable in a direction parallel or substantially parallel to said second direction.

A linear movement of the retroreflector with respect to the assembly formed from the optical input, from the optical output and from the optical element that is said to ensure positional invariance is therefore ensured.

The presently disclosed embodiment advantageously allows a more economical mechanical moving system, which is therefore liable to have few imperfections such as a mechanical play, to be used. A tolerance in the translation vector is thus obtained, which is not acceptable with setups of the prior art. This tolerance is achieved without coupling loss, this allowing the use of a less expensive translation system.

Said retroreflector is a corner-cube reflector or a so-called "cat's-eye" optical setup, this device comprises a plurality of retroreflectors placed alternately on a translationally movable holder and on a fixed base, said fixed base bearing said optical input, said optical output and said optical assembly.

It is thus possible, with a given setup, to increase the optical path traveled by an incident beam.

This optical element that is said to ensure positional invariance is integrally formed.

The expression "integrally formed" is understood to mean that this optical element does not result from the assembly of initially separate parts but, in contrast, is monolithic.

Of course, this optical element that is said to ensure positional invariance may be solid or hollow in order to minimize, or even prevent, monochromatic dispersion.

Being made of glass, at least two of its faces have a reflective coating, such as a dielectric or metal coating.

By way of purely illustrative example, the optical element that is said to ensure positional invariance being made of glass, two faces have a reflective coating, such as a dielectric, metal, or other type of coating, the reflection from the third phase being an internal reflection.

More generally, the optical element that is said to ensure positional invariance is produced from a material that is transparent to the wavelength entering this optical element. It may thus be made of glass, of silicon or even of plastic.

Alternatively, this optical element that is said to ensure positional invariance comprises three planar mirrors or an assembly formed from a prism comprising the first reflective surface, or from a planar or substantially planar mirror, and from a pentaprism comprising the second and third reflective surfaces.

This optical element that is said to ensure positional invariance is configured to allow a relative movement of the first reflective surface and of the assembly formed from said second and third reflective surfaces in order to adjust the positional offset Δ of the input and output beams.

Preferably, said optical element that is said to ensure positional invariance comprises an assembly formed from a pentaprism and from a prism or from a planar or substantially planar mirror.

The pentaprism possesses the property of steering an emergent beam to 90° from the incident beam, whatever the angle of incidence of the beam entering this pentaprism. It is then enough to orient the mirror or the prism such that the reflected beam is parallel to the beam incident on the pentaprism.

This technical solution possesses two particularly advantageous properties:

1/Firstly, it allows a precise offset between incident and emergent beams to be obtained, which will not depend on the quality of manufacture of a monolithic optical element, for example.

2/It also allows an adjustable offset to be obtained, if the mirror or the pentaprism is placed on a mechanically translational element. In practice, it will be preferable to place the pentaprism on the translational element because the beam reflected by the pentaprism will be constantly perpendicular, even if the translation has imperfections in the plane of the pentaprism.

Thus, said pentaprism will, preferably, be translationally movable with respect to said prism or to said mirror.

Said retroreflector being an open corner-cube reflector, it has a flat parallel to one of the three ridges delineating the first, second and third reflective surfaces of the corner-cube reflector.

Advantageously, such a retroreflector offers four solid zones guaranteeing a higher operating tolerance for example to defects in the translation of a movable retroreflector. It is also possible to work with larger beam sizes.

Preferably, this retroreflector is arranged with respect to said optical element and said optical element is configured so that the positional offset Δ between said input and output beams ensures a reflection of the output beam in a central region of each reflective surface, said central region being partially delineated by one of said ridges and an imaginary straight line passing through another of said ridges, without including them.

Thus, an optimization of the space available for each reflective surface of the open corner-cube reflector is obtained, enabling higher operating tolerances.

This device also comprises one or more imaging lenses and/or a fixed optical device for modifying said beam such that a filtering device, placed on the optical path of the beam output from the optical element.

Purely by way of illustration, this fixed optical device may be a spatial light modulator (SLM). It may even be in occulting device.

The presently disclosed embodiment also relates to an optical system comprising an optical-delay-line device providing a fixed or variable optical delay such as described above, one or more additional optical assemblies such as described above and, for each additional optical assembly, an optical communicating assembly for directing the return beam output from the retroreflector of said optical-delay-line device providing a fixed or variable optical delay or from the preceding additional optical assembly, i.e. assembly (n−1), towards the subsequent additional optical assembly, i.e. assembly (n), with n≥2.

Each additional optical element thus comprises:

a retroreflector ensuring a self-alignment of the direction of the output beam with the direction of the incident beam, the direction of the output being opposite to that of the incident beam, an optical element that is said to ensure positional invariance, comprising a first reflective surface, a second reflective surface and a third reflective surface, said first, second and third reflective surfaces being planar or substantially planar, said second and third reflected surfaces being arranged to make therebetween an angle of 45°, the beam that propagates along an optical path and that enters said optical element via its entrance face being reflected by said first surface with an angle of 90° toward said second surface, then being reflected in succession by said second and third surfaces, or reflected along an inverse optical path, in succession by the third surface, the second surface and the first surface, when it enters said optical element in said second direction, said beam is reflected first by said third surface, in order to exit from said optical element in a direction parallel to the direction of the beam incident on said optical element, said output beam having a constant positional offset Δ with respect to the incident beam. Such an optical system advantageously allows very large delays to be obtained with small-diameter beams, i.e. typically beams having a beam diameter smaller than or equal to one (1) mm.

The presently disclosed embodiment also relates to an optical element that is said to ensure positional invariance for implementation in an optical-delay-line device providing a fixed or variable delay such as described above.

According to the disclosed embodiment:

this optical element is monolithic and comprises an entrance face and an exit face, and this optical element comprises a first reflective surface, a second reflective surface and a third reflective surface, said first, second and third reflective surfaces being planar or substantially planar, said second and third reflective surfaces being arranged to make therebetween an angle of 45°, a beam that propagates in a first direction and that enters said optical element via said entrance face being reflected by said first surface with an angle of 90° toward said second surface, then being reflected in succession by said second and third surfaces, or reflected, along an inverse optical path, in succession by the third surface, the second surface and the first surface, when entering said optical element in said second direction, said beam is reflected first by said third surface, in order to exit from said optical element via said exit face in a direction parallel to said first direction of the beam incident on said optical element, said output beam having a constant positional offset Δ with respect to the incident beam.

According to one particular aspect of the disclosed embodiment of this optical element, being made of glass, at least two of its faces have a reflective coating, such as a dielectric or metal coating.

According to another particular aspect of the disclosed embodiment of this optical element, the entrance face of said optical element has a dimension equal to or larger than $\sqrt{3}$ d where d is the total diameter of the beam.

The presently disclosed embodiment further relates to an optical interferometer equipped with an optical-delay-line device providing a fixed or variable optical delay such as described above or with an optical system such as described above.

The presently disclosed embodiment likewise relates to an imaging system for obtaining the image of a sample comprising an optical-delay-line device providing a fixed or variable optical delay such as described above or an optical system such as described above.

The presently disclosed embodiment also relates to an optical sampling device equipped with an optical-delay-line device providing a fixed or variable delay such as described above or with an optical system such as described above.

The presently disclosed embodiment further relates to a range-finding device comprising an optical-delay-line device providing a fixed or variable optical delay such as described above or an optical system such as described above.

BRIEF DESCRIPTION OF THE DRAWINGS

Other advantages, aims and particular features of the presently disclosed embodiment will become apparent from the following description, which is given, for the purposes of explanation and completely nonlimitingly, with reference to the appended drawings, in which.

DETAILED DESCRIPTION

The drawings and description below contain, for the most part, elements of certain character. They will therefore not only serve to better understand the presently disclosed embodiment, but also contribute to its definition, where appropriate.

Firstly, it will be noted that the figures are not to scale.

FIGS. 1 to 4 and 6 schematically show an optical-delay-line device 10 providing a variable delay according to one particular aspect of the presently disclosed embodiment.

Figure 1:
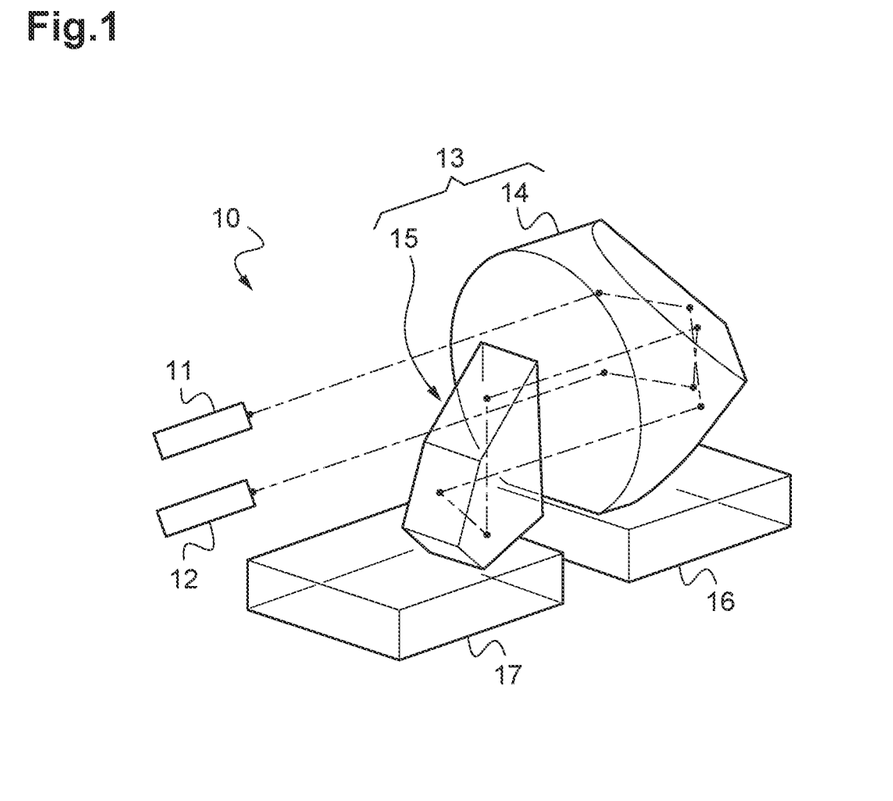
FIG. 1 is a schematic representation of an optical-delay-line device providing a variable delay according to one particular aspect of the disclosed embodiment.

This optical-delay-line device 10 providing a variable optical delay comprises an optical input 11 comprising an input optical fiber and a collimating lens and an optical output 12 comprising an output optical fiber and a steering lens.

It also comprises an optical assembly 13 that directs a beam along an optical path from the optical input 11 of the device to its optical output 12, this optical assembly 13 comprising:

a corner-cube reflector 14 that ensures a self-alignment of the direction of the output beam with the direction of the incident beam, the direction of the output beam, called the second direction, being opposite to that of the incident beam, an optical element 15 that is said to ensure positional invariance, comprising a first reflective surface, a second reflective surface and a third reflective surface, said first, second and third reflective surfaces being planar or substantially planar, said second and third reflective surfaces being arranged to make therebetween an angle of 45°, the beam, which propagates along said optical path and which enters said optical element in said second direction, being reflected by said first surface with an angle of 90° toward said second surface, then being reflected in succession by said second and third surfaces in order to exit from said optical element in a direction parallel to the direction of the beam incident on this optical element, the output beam having a constant positional offset Δ with respect to the incident beam.

The optical element is arranged in the optical assembly 13 in order to steer said emergent beam to the corner-cube reflector 14 so that the beam enters a second time this corner-cube reflector 14. On exiting from the corner-cube reflector 14, the emergent beam is steered level with the incident beam while being offset by a constant value A position-wise.

The corner-cube reflector 14 is mounted on a movable holder 16 with respect to a fixed unit formed from the optical input 11, the optical output 12 and the optical element 15 that is said to ensure positional invariance, so that the length of the optical path traveled by the beam may be adjusted.

Of course, it is possible to use a plurality of corner-cube reflectors 14, alternatively on the movable portion 16 and on a fixed portion 17 bearing this unit, in order to increase the number of there-and-back trips. The only condition is that after the last corner-cube reflector 14, the optical element 15 that is said to ensure positional invariance is placed on the fixed portion 17 bearing the unit and adjusted so as to ensure the parallelism of the incident and emergent beams.

Figure 7:
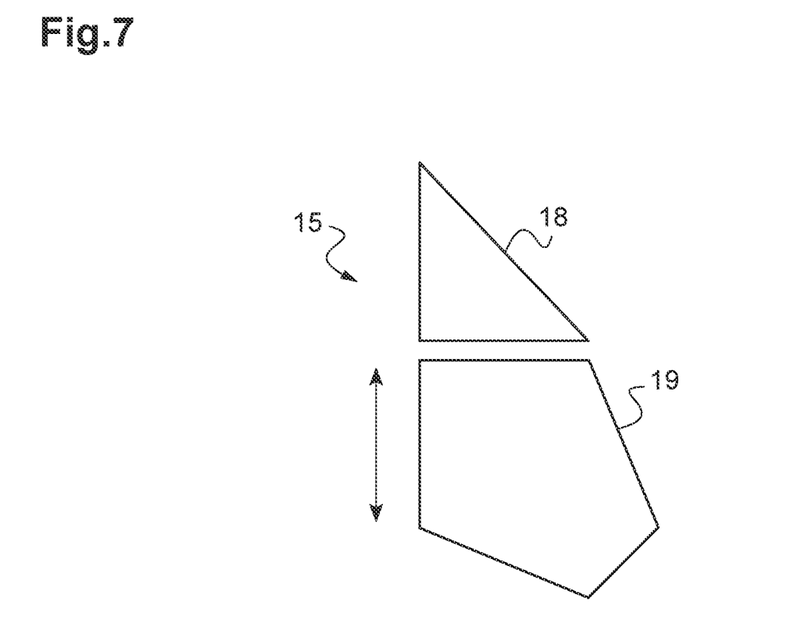
FIG. 7 shows an optical element that is said to ensure positional invariance according to another aspect of the disclosed embodiment.

FIG. 7 shows an optical element that is said to ensure positional invariance according to another aspect of the disclosed embodiment.

This optical element 15 that is said to ensure positional invariance comprises two separate portions, namely a prism 18 defining the first reflective surface of the optical element 15 and a pentaprism 19 comprising the second and third reflective surfaces.

This optical element 15 that is said to ensure positional invariance is configured to allow a relative movement of the first reflective surface and of the set formed from said second and third reflective surfaces in order to adjust the positional offset Δ of the input and output beams. Here, the pentaprism 19 is mounted on a mechanical translating element so as to be movable with respect to the prism 18.

Dimensioning the Optical Elements

1. Corner-Cube Reflector

The corner-cube reflector 14 used in the system is passed through twice by the light beam. For an optimal operation of the optical-delay-line device 10 providing a variable optical delay, the orientation of the corner-cube reflector 14 is carefully determined. The size of the corner-cube reflector 14 for its part depends on the size of the beams used.

Figure 2:
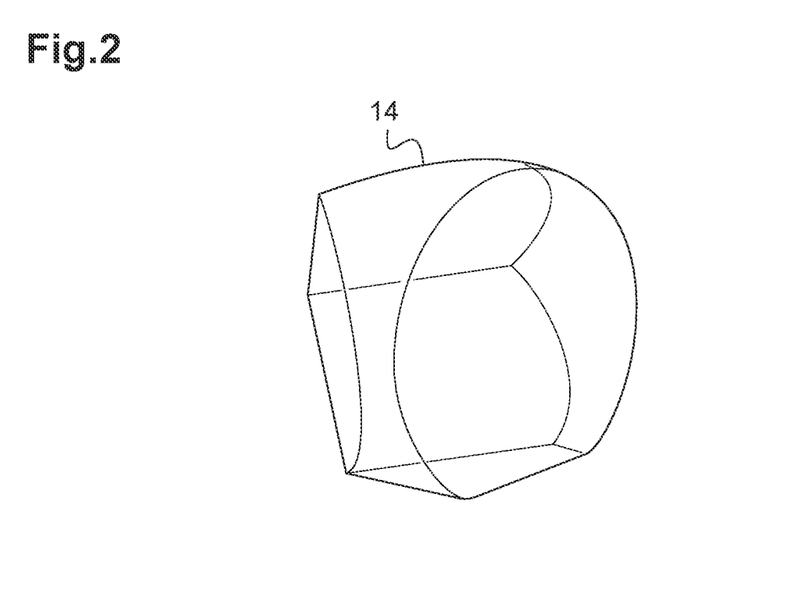
FIG. 2 is a perspective view of the corner-cube reflector of the optical-delay-line device providing a variable optical delay of FIG. 1.
Figure 3:
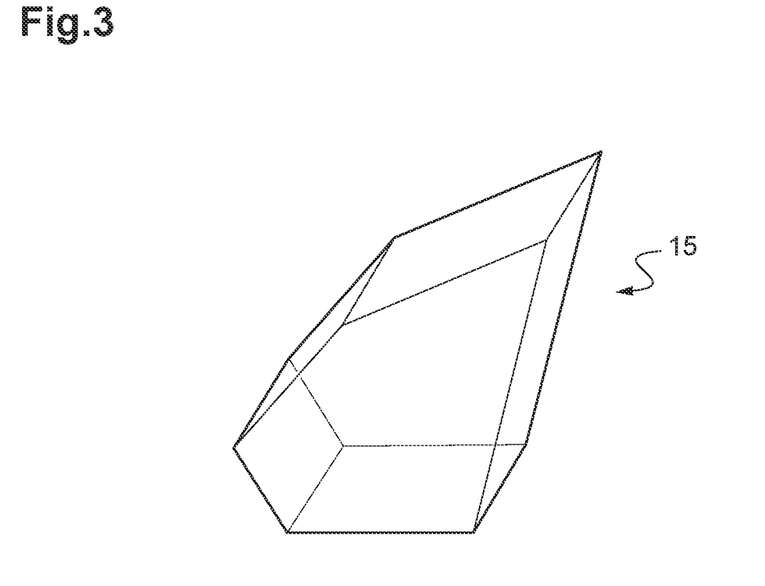
FIG. 3 is a perspective view of the optical element that is said to ensure positional invariance of the optical-delay-line device providing a variable optical delay of FIG. 1.
Figure 4:
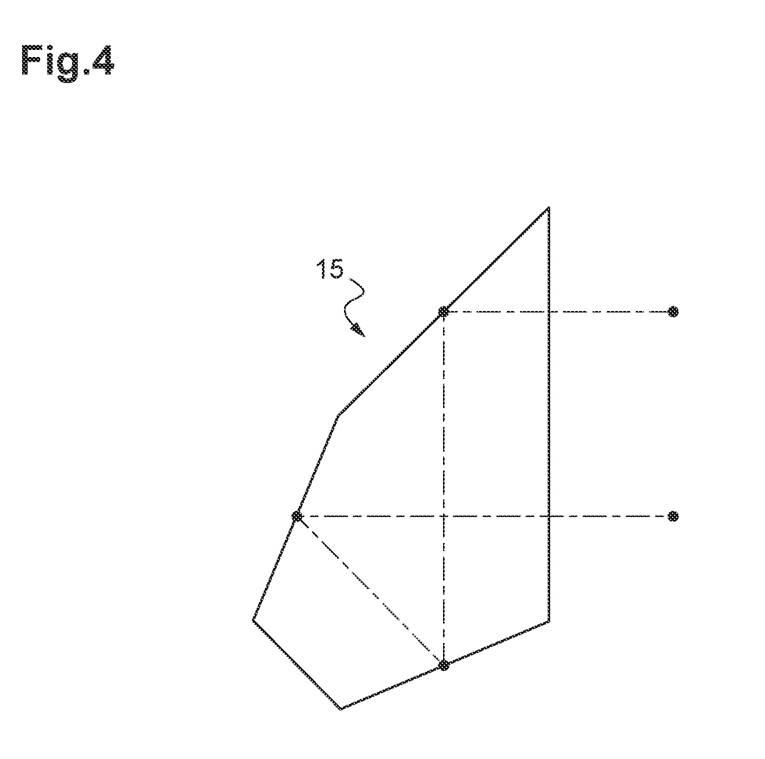
FIG. 4 is a side view of the optical element of FIG. 3 showing the path of an optical beam entering this optical element.

A corner-cube reflector 14 consists of three faces that are perpendicular to one another. The solid lines 20 represent the ridges formed by the intersection of the faces of the corner-cube reflector 14 and the dashed lines 21 represent the symmetric of a ridge on the opposite face. When a light beam enters into a corner-cube reflector 14, it will be reflected, in succession, from each of the three faces, before exiting, parallel to itself, via a point on the corner-cube reflector 14 that is diametrically opposite with respect to the point of entrance into the corner-cube reflector.

To prevent the quality of the beam from being deteriorated by the corner-cube reflector 14, it is necessary to prevent it from reflecting from a ridge 20. It is therefore necessary for the incident beam to be so neither on a ridge (solid line 20) nor on the symmetric of a ridge on its opposite face (dashed line 21). There are therefore six (6) usable angular sectors 22 in a corner-cube reflector 14, via which the incident beam may enter.

Figure 5:
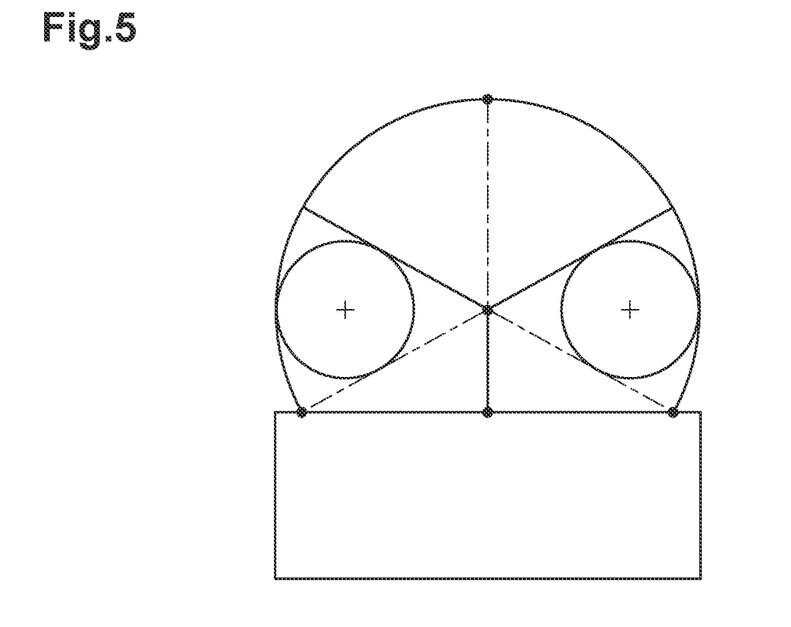
FIG. 5 shows the reflections of the incident and return beams in a prior-art corner-cube reflector.

As shown in FIG. 5, the corner-cube reflectors 14 of the prior art are conventionally used so that the emergent beam exits in a horizontal plane containing the incident beam. A flat perpendicular to one of the ridges is therefore generally machined in the lower part of the corner-cube reflector 14 in order to allow it to be placed on a planar holder.

Figure 6:
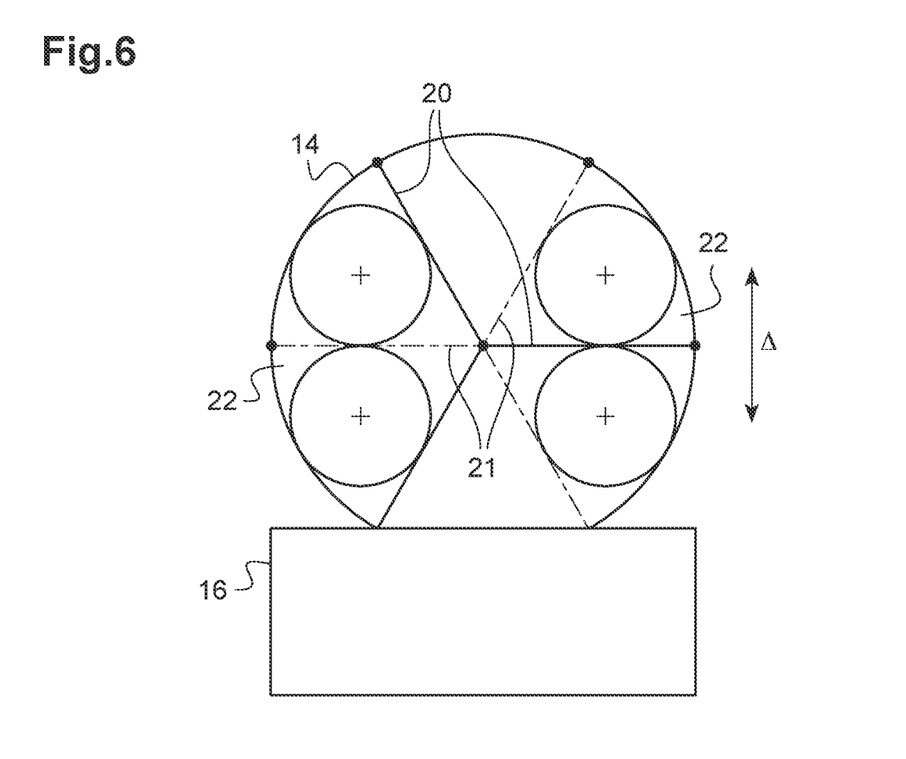
FIG. 6 shows the reflections of the incident and return beams in the corner-cube reflector of the optical-delay-line device providing a variable delay of FIG. 1.

However, in the optical-delay-line device 10 providing a variable optical delay of the disclosed embodiment illustrated in FIG. 6, the corner-cube reflector 14 will be passed through by a second beam, output from the optical element 15 that is said to ensure positional invariance, thereby being positionally offset by a given amount A with respect to the beam emergent from the corner-cube reflector 14.

As this time, four angular sectors are required, it is preferable to produce the flat parallel to one of the three ridges 20 of the corner-cube reflector 14.

Moreover, it is possible, either to place the corner-cube reflector 14 on a planar holder, this requiring the optical element 15 said to be ensure positional invariance to be positioned vertically so that the return beam is above the forward beam such as illustrated here, or to adhesively bond the corner-cube reflector 14 to a vertical holder, this requiring the optical element 15 that is said to ensure positional invariance to be positioned horizontally so that the return beam is beside the forward beam. Intermediate orientations are also possible but they then require the optical element 15 that is said to ensure positional invariance to be precisely oriented and make placing the optical-delay-line device 10 providing a variable optical delay more complex.

The central cross of each angular sector represents the optional position of the corresponding beam.

As regards the size of the corner-cube reflector 14, it must be chosen so as to prevent reflections from the ridges and to prevent the beam from being vignetted by the corner-cube reflector 14. As shown in FIG. 6, the minimum size of the corner-cube reflector 14 is such that the diameter of the beam is inscribed in an equilateral triangle formed by one angular sector. Thus, if the total diameter of the beam is denoted d, the diameter D of the corner-cube reflector 14 must be at least equal to:

$$D = 3d \qquad \text{[Math. 1]}$$

In practice, this configuration is not very positionally tolerant, this on the one hand obliging the corner-cube reflector 14 to be precisely positioned and on the other hand not corresponding to the philosophy of the system, the aim of which is to allow an output beam that is invariant whatever the position of the various optical components of the device to be obtained. Corner-cube reflector diameters of five (5) to ten (10) times larger than the diameter of the incident beam will therefore preferably be chosen.

2. Optical Element that is Said to Ensure Positional Invariance

The aim of this optical element is to steer a beam with a constant positional offset. For the system to operate optimally, it is necessary for this positional offset Δ to correspond to the spacing between the centers of gravity of the two successive equilateral triangles formed by the angular sectors of the corner-cube reflector 14. As a result, the offset, which is denoted Δ, must respect the following formula:

$$\Delta = \frac{\sqrt{3}}{6} D \qquad \text{[Math. 2]}$$

The entrance face of the optical element must then be equal to twice the desired offset Δ, assuming that it is desired to have the incident beam perpendicular to the entrance face.

Potential Derived Applications

1. Addition of Imaging Adjustment Lenses

One of the objectives of this system is to make it possible to produce large linear movements without having to suffer because of mechanical imperfections related to the translating system, which would result in substantial variations in the degree of coupling to the output fiber.

However, to guarantee small variations in the degree of coupling over large distance ranges, it is necessary to work with Gaussian beams of large diameters.

Specifically, a Gaussian beam is characterized by its waist $\omega_0$, which represents the radius for which the power density of the beam is decreased by a factor $1/e^2$. It may then be shown that 99% of the optical power is contained in a disk of radius $3\omega_0$. If two Gaussian beams, of identical waists $\omega_0$, and which are perfectly aligned with each other, i.e. their optical axes are coincident, are considered and the distance between their respective waists is denoted D, it is possible then to show that the degree of coupling between these two beams may be expressed by the following formula:

$$\eta = \frac{1}{1 + \frac{\lambda^2 D^2}{4\pi^2 \omega_0^4}} \qquad \text{[Math. 3]}$$

Thus, if a 10 ns delay line is desired, this corresponding to a distance of about 3 m, it is necessary to work with beams having a waist of 1.3 mm at least in order to obtain variations in coupling losses of at most 0.2 dB.

However, working with beams of large diameters is constraining because their alignment is much more angularly sensitive. Thus, the collimators that generate such beams become very tricky to place and it is in the end of the size of the beams that puts an upper limit on the movements achievable.

One solution however allows this drawback to be overcome. It consists in using smaller beams and in placing imaging lenses on the optical path. Specifically, for a given waist size, there is a lens focal length that allows, if the waste is placed at the object focal point of the lens, a waist of identical size located at the image focal point of the lens to be obtained. The focal length required is given by the following formula:

$$f' = \frac{\pi \omega_0^2}{\lambda} \qquad \text{[Math. 4]}$$

It is thus possible to obtain a degree of coupling of 100% between two identical waists located at a distance 2f' from each other, by inserting a lens of focal length f' halfway between the two waists.

In addition, it may be observed that, if the distance between the lens and each of the two waists is identical, degrees of coupling that remain close to 100% are obtained even if the two waists are not separated by the optimal distance 2f'. Thus, if they are separated simply by f' or 3f', the degree of coupling is about 0.05 dB, this being almost negligible. Furthermore, for distances ranging from 0 (the two waists are coincident with the lens) to 4f', the degree of coupling changes to about 0.5 dB.

Moreover, it is possible to multiply the number of lenses, with an identical distance therebetween. For an optimal distance 2f' between each lens, a perfect theoretical coupling of 100% is preserved, and for distances varying between f' and 3f', a theoretical degree of coupling lower by 0.1 dB is preserved, whatever the number of lenses. This is also valid whatever the waist of the beams, provided that the focal length of the lenses meets the above formula.

It is therefore possible to produce large delays using small beams, which are simpler to manipulate, if it is possible to use imaging lenses. The drawback of using lenses is that the optical axis of the incident beam and the optical axis of the lens must systematically be coincident (or, at least, their relative positions with respect to each other must remain fixed) in order to ensure the emergent beam remains spatially invariant (in direction and in position) and to ensure the degree of coupling does not vary. It is in this respect that the optical assembly 13 of the optical-delay-line device 10 providing a variable optical delay of the disclosed embodiment is particularly effective. Specifically, it is easily possible to envision replacing the output collimator of the optical assembly 13 with a lens, and to thereby take advantage of the fact that the optical axis of the beam in this location will remain the same whatever the movement of the system. It is then possible for the propagation of the beam to continue in an identical optical assembly 13 placed beside the first, and for as many lenses as required to obtain a very large movement with small beams to be inserted in this way.

Figure 8:
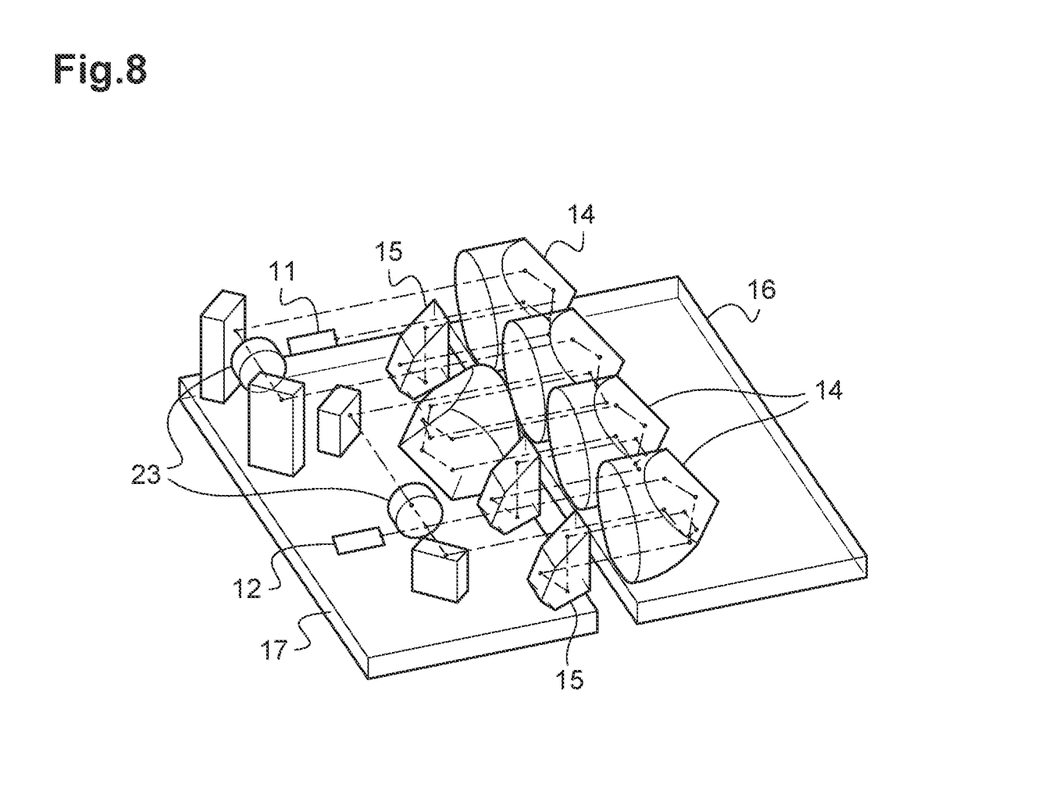
FIG. 8 schematically shows an optical system comprising two additional optical assemblies, according to one particular aspect of the disclosed embodiment.

FIG. 8 shows such an optical setup. However, in such a configuration, it is necessary to correctly choose the size of the beams, the focal length of the lenses and the movement of the translating system if the components of the assembly are to work together perfectly. The relationship that there must be between the focal length of the imaging lenses 23 and the size of the beams has already been seen. The length that the translating stage must have, which length is denoted L, for distances between f' and 3f' to be preserved is for its part defined by the following relationship:

$$L=f'/4 \qquad \text{[Math. 5]}$$

Lastly, the delay that it will be possible to obtain is directly proportional to the number N of lenses that are used and is equal to:

$$\tau = \frac{2Nf'}{c} \qquad \text{[Math. 6]}$$

Thus, and purely by way of illustration, if a delay of 10 ns is desired, using a simple system comprising two lenses 23, it will be necessary to use focal lengths of about 75 cm and a translation of 18.75 cm. The required size of the beams will then be 610 μm, i.e. a little less than half that required in a lensless system.

Figure 9:
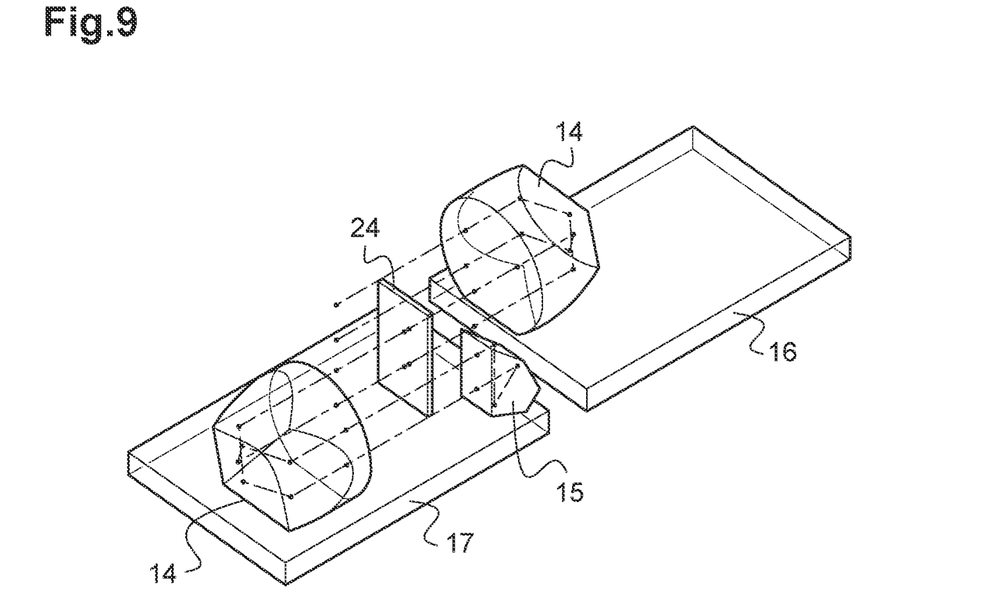
FIG. 9 schematically represents a self-reflective polarization-maintaining system according to one particular aspect of the disclosed embodiment.

FIG. 9 schematically represents a self-reflective polarization-maintaining system according to one particular aspect of the presently disclosed embodiment.

The elements in FIG. 9 having the same references as the ones illustrated in FIGS. 1 to 8 represent the same objects, which therefore will not be described again below.

This self-reflective system comprises two corner-cube reflectors 14, an optical element that is said to ensure positional invariance 15 and a half-wave plate 24.

This half-wave plate 24 has its own axes oriented at 45° degrees relative to the support plane. This plate can independently be placed on a mobile support 16 or on a fixed support 17, as shown here.

If several corner-cube reflectors 14 are used, the half-wave plate 24 must be placed so that there are as many corner-cube reflectors 14 before and after. It therefore requires an even number of corner-cube reflectors 14 and therefore if necessary, a corner-cube reflector should be added on the fixed support 17, before the optical element that is said to ensure positional invariance 15, as shown here.

In FIG. 9, the half-wave plate 24 is sized to be present on the input-and-return beam. Thus, the polarization of the output beam will be identical to the polarization at the input.

Alternatively, this half-wave plate 24 may be present on only one of the two paths (input or return) and then, the polarization of the output beam will be orthogonal to the polarization of the input beam.

What is claimed is:

1. An optical-delay-line device providing a fixed or variable optical delay, said device comprising:
    an optical input,
    an optical output,
    an optical assembly that directs a beam along an optical path from said optical input to said optical output, said optical assembly comprising:
        a retroreflector that ensures a self-alignment of the direction of the output beam with the direction of the incident beam, the direction of the output beam, which is called the second direction, being opposite to that of the incident beam, and
        an optical element configured to ensure positional invariance of the output beam with respect to the incident beam, comprising a first reflective surface, a second reflective surface and a third reflective surface, said first, second and third reflected surfaces being planar or substantially planar, said second and third reflective surfaces being arranged to make therebetween an angle of 45°, the beam that propagates along said optical path and that enters said optical element in said second direction, being reflected by said first surface with an angle of 90° toward said second surface, then being reflected in succession by said second and third surfaces, or reflected along an inverse optical path, in succession by the third surface, the second surface and the first surface, when it enters said optical element in said second direction, said beam is reflected first by said third surface, in order to exit from said optical element in a direction parallel to the direction of the beam incident on said optical element, said output beam having a constant positional offset Δ with respect to the incident beam,
    said optical element being arranged in said optical assembly so as to steer said output beam onto said retroreflector, the output beam thus passing through said retroreflector.

2. The device as claimed in claim 1, wherein said retroreflector is movable with respect to said optical input and optical output and with respect to said optical element in order to vary the length of said optical path.

3. The device as claimed in claim 1, wherein it comprises a plurality of retroreflectors placed alternately on a translationally movable holder and on a fixed base, said fixed base bearing said optical input, said optical output and said optical assembly.

4. The device as claimed in claim 1, wherein said optical element is monolithic.

5. The device as claimed in claim 4, wherein it is made of glass, at least two of its faces having a reflective coating.

6. The device as claimed in claim 1, wherein said optical element comprises three planar mirrors or an assembly formed from a planar or substantially planar mirror, or from a prism comprising the first reflective surface, and from a pentaprism comprising the second and third reflective surfaces.

7. The device as claimed in claim 6, wherein said optical element is configured to allow a relative movement of the first reflective surface and of the assembly comprising said second and third reflected surfaces in order to adjust said positional offset Δ of the input and output beams.

8. The device as claimed in claim 6, wherein said optical element comprises an assembly formed from a pentaprism and from a prism or from a planar or substantially planar mirror, said pentaprism is translationally movable with respect to said prism or to said mirror.

9. The device as claimed in claim 1, wherein said retroreflector being an open corner-cube reflector, it has a flat parallel to one of the three ridges delineating the first, second and third reflective surfaces of the corner-cube reflector.

10. The device as claimed in claim 1, wherein said retroreflector is arranged with respect to said optical element and said optical element is configured so that the positional offset Δ between said input and output beams ensures a reflection of the output beam in a central region of each reflective surface of said open corner-cube reflector, said central region being partially delineated by one of said ridges and an imaginary straight line passing through another of said ridges, without including them.

11. The device as claimed in claim 1, wherein it also comprises one or more imaging lenses and/or a fixed optical device for modifying said beam, placed on the optical path of the beam output from the optical element.

12. An optical system comprising an optical-delay-line device providing a fixed or variable optical delay as claimed in claim 1, one or more additional optical assemblies as claimed in claim 1 and, for each additional optical assembly, an optical communicating assembly for directing the output beam output from the retroreflector of said optical-delay-line device providing a fixed or variable optical delay or from the preceding additional optical assembly, i.e. assembly (n-1), towards the subsequent additional optical assembly, i.e. assembly (n), with n>2.

13. An optical element for implementation in an optical-delay-line device providing a fixed or variable optical delay as claimed in claim 1, wherein
said optical element is monolithic, said optical element comprising an entrance face and an exit face, and said optical element comprises a first reflective surface, a second reflective surface and a third reflective surface, said first, second and third reflective surfaces being planar or substantially planar, said second and third reflective surfaces being arranged to make therebetween an angle of 45°, a beam that propagates in a first direction and that enters said optical element via said entrance face being reflected by said first surface with an angle of 90° toward said second surface, then being reflected in succession by said second and third surfaces, or reflected along an inverse optical path, in succession by the third surface, the second surface and the first surface, when it enters said optical element in said second direction, said beam is reflected first by said third surface, in order to exit from said optical element via said exit face in a direction parallel to said first direction of the beam incident on said optical element, said output beam having a constant positional offset Δ with respect to the incident beam.

14. An optical interferometer equipped with an optical-delay-line device providing a fixed or variable optical delay as claimed in claim 1.

15. An imaging system for obtaining the image of a sample comprising an optical-delay-line device providing a fixed or variable optical delay as claimed in claim 1.

16. An optical sampling device equipped with an optical-delay-line device providing a fixed or variable optical delay as claimed in claim 1.

17. A self-aligned laser cavity comprising an optical-delay-line device providing a fixed or variable optical delay as claimed in claim 1.

* * * * *